Oct. 8, 1946.    W. E. LEAKE, JR    2,408,859
OUTDOOR COOKING APPARATUS
Filed Aug. 17, 1945
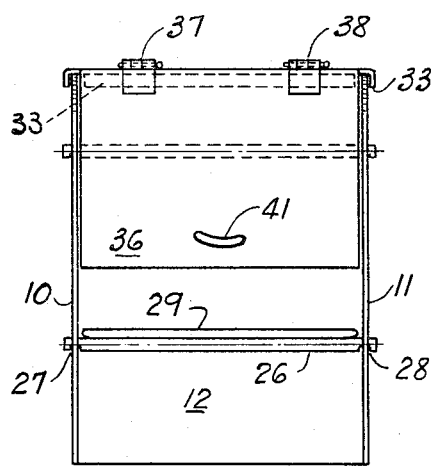
Fig.-1
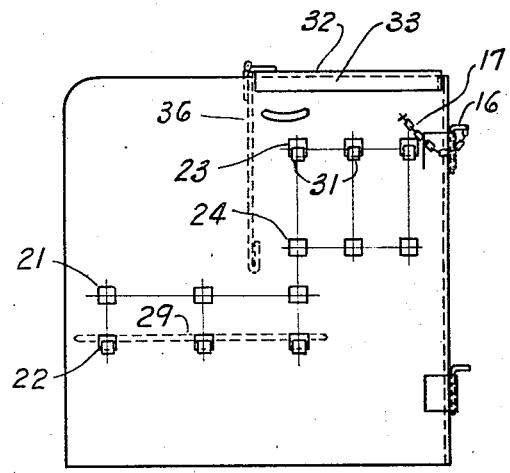
Fig.-2
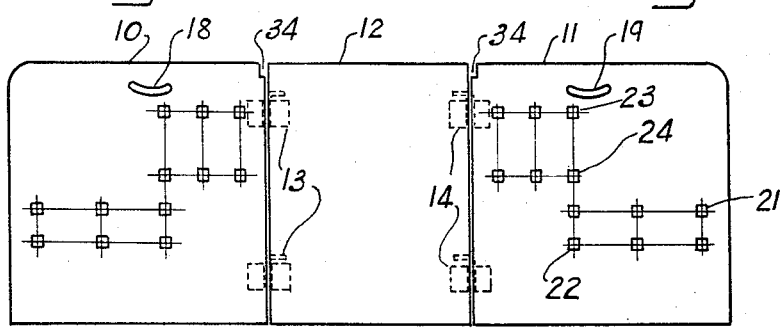
Fig.-3
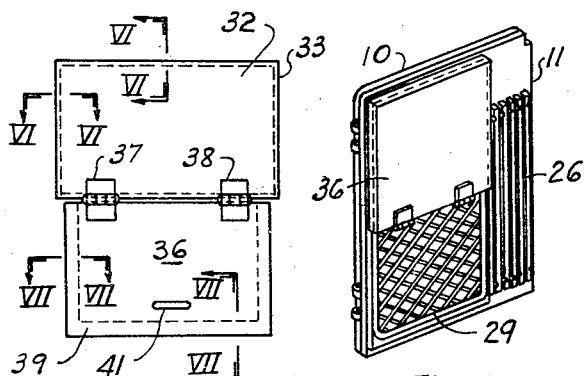
Fig.-4
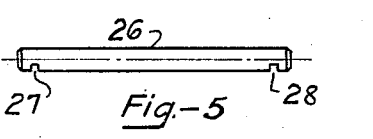
Fig.-5
Fig.-6
Fig.-7
Fig.-8
INVENTOR.
William E. Leake Jr.
BY
Henry L. Jennings
ATTORNEY Patented Oct. 8, 1946

2,408,859

UNITED STATES PATENT OFFICE 2,408,859

OUTDOOR COOKING APPARATUS

William E. Leake, Jr., Birmingham, Ala., assignor to W. E. Leake Company, Inc., a corporation of Alabama Application August 17, 1945, Serial No. 611,174

3 Claims. (Cl. 126—9)

This invention relates to cooking apparatus of the type designed especially for camping and outdoor cooking and has for its principal object the provision of apparatus of the character designated which shall include a grill and an oven, and which shall be simple of design, rugged of construction, light of weight, and may be readily disassembled and collapsed in a flat package occupying little space, so that it may be easily shipped or stored.

A still further object of my invention is the provision of cooking apparatus of the character indicated which may be readily assembled and disassembled and shall embody an adjustable grill and an oven, with the grill supported by bars which hold the cooker rigidly in assembled relation when in use.

Apparatus embodying features of my invention is illustrated in the accompanying drawing, forming a part of this application, in which Fig. 1 is a front elevational view;

Fig. 2 is a side elevation;

Fig. 3 is a view in elevation showing the back and sides hinged together and opened out;

Fig. 4 is a plan view of the cover and front separate from the remainder of the apparatus;

Fig. 5 is a detail view of one of the grill supporting rods;

Fig. 6 is a sectional view taken along the lines VI—VI of Fig. 4;

Fig. 7 is a sectional view taken along the lines VII—VII of Fig. 4; and

Fig. 8 is a perspective view showing the cooker disassembled, and ready for moving or storage.

Referring now to the drawing for a better understanding of my invention, my improved cooking apparatus comprises sides 10 and 11, made of sheet metal, and connected to a back 12 by means of lateral hinges 13 and 14. In order to provide for ready disassembly each of the hinges may be provided with a removable hinge pin 16 having connected thereto a chain 17 with its other end secured to the adjacent side. The sides 10 and 11 are provided with handling slots 18 and 19 so that they may be readily grasped and held in place when assembling. Each of the sides 10 and 11 is provided with upper and lower rows of horizontally aligned, spaced holes 21 and 22. Each side is also provided with rearwardly disposed upper and lower rows of horizontally aligned spaced holes 23 and 24, which rows of holes are disposed at a higher elevation than the rows 21 and 22. As shown in the drawing, the holes are rectangular in cross section, though it will be apparent that any suitable shape may be employed. Extending across one of the rows of holes 21 or 22, as may be selected, are rods 26 which correspond in number to the number of holes in a row. The rods 26 are each provided near the end with notches 27 and 28 which hook over the bottom edges of the holes and hold the sides 10 and 11 rigidly in spaced relation. Supported on the rods 26 is a grill 29 which may be of any suitable design and preferably is adapted for outdoor broiling. The space beneath the rods 26 is utilized for maintaining a fire, which preferably is maintained with charcoal.

Extending across one or both rows 23 or 24, of the upper rows of holes, are rods 31, which are in all respects similar to the rods 26 shown in detail in Fig. 5 and are provided with notches in the ends thereof, as shown, to hook over the bottoms of the holes and aid in holding the sides 10 and 11 in properly spaced relation. As will be noted in Fig. 2, the holes in the rows 23 and 24 are more closely spaced than in the rows 21 and 22, thereby obtaining a closer spacing for the rods 31 than for the rods 26. The rods 31 thus form a support for cooking vessels, not shown, which may be rested on them.

Fitting over the sides 10 and 11, towards the rear of the apparatus, is a cover 32. The cover 32 is provided around its sides, front and rear with a depending flange 33. The flange 33 fits down over the sides, as shown in Figs. 1 and 2, and at the rear fits over a shoulder 34 formed at the rear of the sides 10 and 11. Across the front it stops short of the sides so as to fit between the sides 10 and 11. The cover thus assists in holding the sides in properly spaced assembled relation. As will be noted from Fig. 2, the cover 32 extends forwardly a short distance beyond the forward ends of the rows of holes 23 and 24.

Hingedly connected to the forward edge of the cover 32, by hinges 37 and 38, is a front, or oven door 36. The edge of the door 36 is turned over along the sides and bottom as shown at 39 in Fig. 7 for the purpose of reinforcing it. A slot 41 near the lower edge of the front provides a means whereby it may be raised and lowered.

The apparatus may be disassembled by merely lifting off the cover 32, disconnecting the sides from the back, withdrawing the transverse rods 26 and 31 and the grill 29, whereupon all the parts may be assembled into a thin, flat package as shown in Fig. 9. When disassembled the separate parts may be readily washed with a suitable cleaning agent.

From the foregoing description, the operation and advantages of my improved cooking apparatus will be readily appreciated. When the apparatus is assembled as shown in Figs. 1 and 2, a fire is placed in the space beneath the grill 29. The grill 29 may be used for broiling, or barbecuing meat, while the rearward space behind the door 36 forms a very efficient oven. Cooking vessels may be supported on the rods 31, which rods may be placed either in the upper or lower row of holes 23 or 24, or both, as the nature of the food being cooked and the heat requirement will determine. The walls 10 and 11 arising alongside the grill 29 aid in retaining the heat between the walls and thus insure an even cooking of the food. The apparatus may be made of any suitable material, and if made of such metals as aluminum or aluminum alloy, it can be made of very light weight.

From the foregoing, it will be apparent that I have devised an improved cooking apparatus which is simple of construction, readily assembled, and disassembled, and adapted to be formed into a relatively small thin package for storing or shipping.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. An outdoor cooker comprising spaced apart, sheet metal sides each having a plurality of forwardly disposed rows of horizontally aligned spaced holes therein, a plurality of rearwardly disposed rows of horizontally aligned, spaced holes in the sides disposed at a higher elevation than the forwardly disposed holes, a back detachably connecting the sides, a cover over the rearward portion of the apparatus spanning the sides and adjoining the back, and a front hingedly connected to the forward edge of the cover and freely depending downwardly between the sides at the rear of the forwardly disposed rows of holes and in front of the rearwardly disposed upper rows of spaced holes, to form an oven.

2. An outdoor cooking apparatus comprising spaced apart, sheet metal sides, each having a plurality of forwardly disposed rows of spaced, aligned holes therein and a plurality of rearwardly disposed, spaced, aligned holes therein disposed at a higher level than the forwardly disposed holes, supporting rods spanning the sides in selected rows of both the forwardly disposed and rearwardly disposed holes and each having notches near the ends thereof engaging the sides, a grill supported by the rods in the forwardly disposed holes, a cover for the rearward portion of the apparatus, and a door hinged to the front edge of the cover and adapted to hang downwardly in front of the rows of rearwardly disposed holes and terminating at a level above that of the forwardly disposed rows of holes, thereby forming with the sides and rear of the apparatus an oven.

3. An outdoor cooking apparatus comprising spaced apart, sheet metal sides, each having a plurality of forwardly disposed rows of spaced, aligned holes therein and a plurality of rearwardly disposed, spaced, aligned holes therein disposed at a higher level than the forwardly disposed holes, supporting rods spanning the sides in selected rows of both the forwardly disposed and rearwardly disposed holes and each having notches near the ends thereof engaging the sides, a grill supported by the rods in the forwardly disposed holes, a cover for the rearward portion of the apparatus, and a front door hinged to the front edge of the cover and hanging downwardly in front of the rows of rearwardly disposed holes terminating at a level above that of the forwardly disposed rows of holes, thereby forming with the sides and rear of the apparatus an oven, and a flange on the sides and rear of the cover overhanging the sides and engaging the sides at the rear, there being a notch in each of the sides at the rear to receive the flange.

WILLIAM E. LEAKE, Jr.